United States Patent
Chen et al.

(10) Patent No.: US 8,085,022 B2
(45) Date of Patent: Dec. 27, 2011

(54) SWITCHING REGULATOR AND CONTROL CIRCUIT THEREOF, AND METHOD FOR DETERMINING ON-TIME IN SWITCHING REGULATOR

(75) Inventors: An-Tung Chen, Pingzhen (TW); Jo-Yu Wang, Hsinchu (TW)

(73) Assignee: Richtek Technology Corporation, Hsin-Chu (TW)

( * ) Notice: Subject to any disclaimer, the term of this patent is extended or adjusted under 35 U.S.C. 154(b) by 30 days.

(21) Appl. No.: 12/658,571

(22) Filed: Feb. 5, 2010

(65) Prior Publication Data

US 2010/0301822 A1 Dec. 2, 2010

(30) Foreign Application Priority Data

Jun. 1, 2009 (TW) .............................. 98117967 A

(51) Int. Cl.
*G05F 1/00* (2006.01)
(52) U.S. Cl. .......................... 323/282; 323/283; 323/288
(58) Field of Classification Search .................. 323/222, 323/271, 282, 283, 284, 286, 288
See application file for complete search history.

(56) References Cited

U.S. PATENT DOCUMENTS

| | | | |
|---|---|---|---|
| 6,396,252 B1 * | 5/2002 | Culpepper et al. | 323/285 |
| 7,456,624 B2 | 11/2008 | Sheng et al. | |
| 7,471,072 B2 * | 12/2008 | Fogg et al. | 323/284 |
| 2006/0268974 A1 * | 11/2006 | Chu et al. | 375/238 |
| 2009/0079408 A1 * | 3/2009 | Qiao et al. | 323/283 |
| 2009/0273326 A1 * | 11/2009 | Lipcsei | 323/282 |
| 2010/0026256 A1 * | 2/2010 | Liu et al. | 323/282 |

* cited by examiner

*Primary Examiner* — Adolf Berhane
*Assistant Examiner* — Nguyen Tran
(74) *Attorney, Agent, or Firm* — Tung & Associates

(57) ABSTRACT

The present invention discloses a switching regulator and control method thereof, and a method for determining On-time in switching regulator. The switching regulator comprises: a power switch circuit including at least one power transistor switch which operates to convert an input voltage to an output voltage; a PWM generation circuit for generating a duty signal in a normal operation mode according to a feedback signal relating to the output voltage; a pulse skipping circuit for determining On-time in a pulse skipping mode according to a node with non-constant voltage level, the node being connected with the power transistor switch; and a driver circuit for driving the at least one power transistor switch according to one of the outputs from the PWM generation circuit and the pulse skipping circuit.

18 Claims, 5 Drawing Sheets

SWITCHING REGULATOR AND CONTROL CIRCUIT THEREOF, AND METHOD FOR DETERMINING ON-TIME IN SWITCHING REGULATOR

BACKGROUND OF THE INVENTION

1. Field of Invention

The present invention relates to a switching regulator and control method thereof, and a method for determining On-time in switching regulator; particularly, it relates to a method for determining On-time in a pulse skipping mode (PSM) without an input or output voltage signal.

2. Description of Related Art

There are many types of switching regulators, such as buck converter, boost converter, inverter converter, and buck-boost converter, etc. By way of example, FIG. 1 shows a conventional buck switching regulator 1 comprising two transistors Q1 and Q2, which are controlled by a control circuit 10. The control circuit 10 generates switching control signals DRV1 and DRV2 according to a feedback signal FB obtained from the output Vout, and the transistor switches Q1 and Q2 are controlled by the control signals to convert electrical power from an input Vin to an output Vout. FIGS. 2-4 show a boost converter 2, an inverter converter 3, and a buck-boost converter 4, respectively. Though the circuit architecture and the number of transistors are different, these circuits operate under the same mechanism: The control circuit 10 generates control signals according to the feedback signal FB, and the power transistor switches operate to convert the electrical power from the input Vin to the output Vout according to the control signals. In these circuits, one of the power transistor switches can be replaced by a diode to constitute an asynchronous switching regulator.

In the aforementioned switching regulators, there is a light load efficiency issue if the power transistor switch still operates in the pulse width modulation (PWM) mode in light load condition ("light load" means that the load current, i.e., current supplied to a load circuit, is relatively low). Taking a synchronous buck converter as an example, when the load current is declining, and the operation mode is still the continuous conduction mode (CCM), the electrical power is back to the input from the output once the lower bridge current is less than zero. A power conversion inefficient issue occurs in consequence. Thus, as the inefficient issue occurs, it is indispensable to operate the lower bridge circuit in a mode like a non-synchronous diode mode, a so-called diode emulated mode, such that the regulator can enter a discontinuous conduction mode (DCM). When the regulator enters DCM from CCM, the COMP voltage decreases by following the decline of the load current, and then a duty signal pulse width decrease as well. Therefore, when the load current is extremely low, due to the pulse width too narrow, the electrical power converted from the input to the output will be extremely limited. Meanwhile, the power switching loss of operating the upper and lower bridge transistors each time remains nearly unchanged. And then, when the load current is extremely low, it is appropriate to maintain a minimum On-time of the power transistor switch but reducing the operation frequency, i.e., a pulse skipping mode. It is very important how to determine On-time in the pulse skipping mode. But On-time relates to the application environment (like input voltage and output voltage) of the regulator. It is appropriate to set On-time according to the environment of the regulator. If On-time is too long, the ripple of the voltage will be too large; if too short, the efficiency improvement will be limited.

In view of foregoing, U.S. Pat. No. 7,456,624 discloses a method and circuit for entering the pulse skipping mode as shown in FIG. 5. This prior art does not disclose the circuit details. According to the specification and figures, this prior art needs the input voltage Vin and the output voltage Vout to determine whether entering the pulse skipping or not mode and On-time in the pulse skipping mode. The drawback of this prior art is that, there is an essential requirement of two extra pins of the integrated circuit (IC, in general, the control circuit 10 is manufactured to an IC) to obtain the Vin and Vout signals. Not only extra two pins are essentially required in the IC, but it also can cause an inaccurate issue due to an error of handling the two signals. This prior art have obstacles in the circuit design and embodiment.

In view of the above drawbacks, it is necessary to introduce a method, and a relating switching regulator and a control method therefor that can determine On-time in the pulse skipping mode without the input voltage and the output voltage.

SUMMARY OF THE INVENTION

The first objective of the present invention is to provide a switching regulator that can determine On-time in the pulse skipping mode without the input voltage and the output voltage.

The second objective of the present invention is to provide a switching regulator control circuit.

The third objective of the present invention is to provide a method for determining On-time in switching regulator.

To achieve the purposes mentioned above, from one perspective, the present invention provides a switching regulator comprising: a power switch circuit including at least one power transistor switch which operates to convert an input voltage to an output voltage; a PWM (Pulse Width Modulation) generation circuit for generating a duty signal in a normal operation mode according to a feedback signal relating to the output voltage; a pulse skipping circuit for determining on-time in a pulse skipping mode according to a signal from a node with non-constant voltage level, the node being connected with the power transistor switch; and a driver circuit for driving the at least one power transistor switch according to one of the outputs from the PWM generation circuit and the pulse skipping circuit.

From another perspective, the present invention provides a control circuit for controlling a switching regulator to convert an input voltage to an output voltage by operating at least one power transistor switch, the power transistor switch having a terminal coupled to a node with non-constant voltage level, the control circuit comprising: a pin receiving a signal from the node with non-constant voltage level; a PWM generation circuit for generating the duty signal in a normal operation mode according to a feedback signal relating to the output voltage; a pulse skipping circuit for determining on-time in a pulse skipping mode according to the signal from the node; and a driver circuit for generating a driver signal according to one of the outputs from the PWM generation circuit and the pulse skipping circuit.

In switching regulator aforementioned, the pulse skipping circuit includes: an average circuit for obtaining an average of the signal from the node and outputting a signal proportional to the average; a sawtooth wave generator for generating a sawtooth wave signal according to the signal from the node, wherein the slope of the sawtooth wave signal relates to the input voltage; and a comparator for comparing the output of the average circuit with the sawtooth wave signal to determine the on-time in the pulse skipping mode.

In one type of the embodiments, the pulse skipping circuit further includes: a minimum on-time generation circuit; and a selection circuit for selecting a wider pulse width output from the outputs of the comparator and the minimum on-time generation circuit.

From another perspective, the present invention provides a method for determining On-time in a switching regulator which converts an input voltage to an output voltage by operating at least one power transistor switch, the power transistor switch having a terminal coupled to a node with a non-constant voltage level, the method comprising the steps of: generating a signal relating to an average of a signal from the node; generating a sawtooth wave signal according to the signal from the node, wherein the slope of the sawtooth wave signal relates to the input voltage; and determining on-time in the pulse skipping mode by comparing the signal relating to the average of the signal from the node with the sawtooth wave signal.

The aforementioned method further comprising: generating a clock signal having a pulse width which is the minimum on-time; and determining a start time of the on-time in the pulse skipping mode according to a rising edge of the clock signal, and an end time according to the later of a falling edge of the clock signal and the end time of the on-time in the pulse skipping mode determined in the comparing step, the pulse skipping circuit generates a pulse skipping signal according to a current through the error amplification signal clamping circuit.

The present invention can be applied to a synchronous or a non-synchronous buck converter, boost converter, inverter converter, and buck-boost converter etc.

The objectives, technical details, features, and effects of the present invention will be better understood with regard to the detailed description of the embodiments below.

DESCRIPTION OF THE PREFERRED EMBODIMENTS

Figure 1:
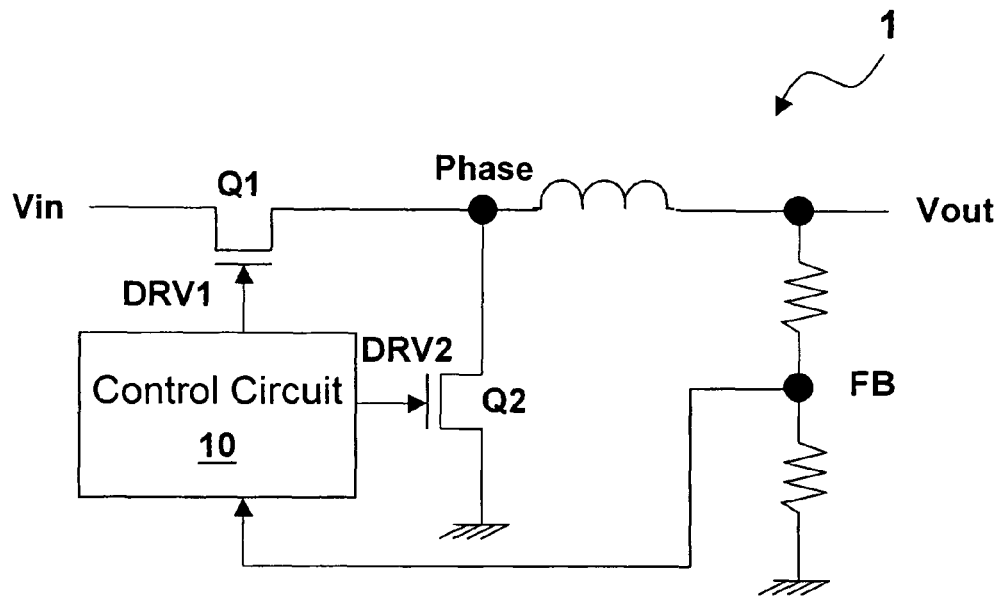
FIGS. 1-4 show conventional buck converter, boost converter, inverter converter, and buck-boost converter, respectively.
Figure 2:
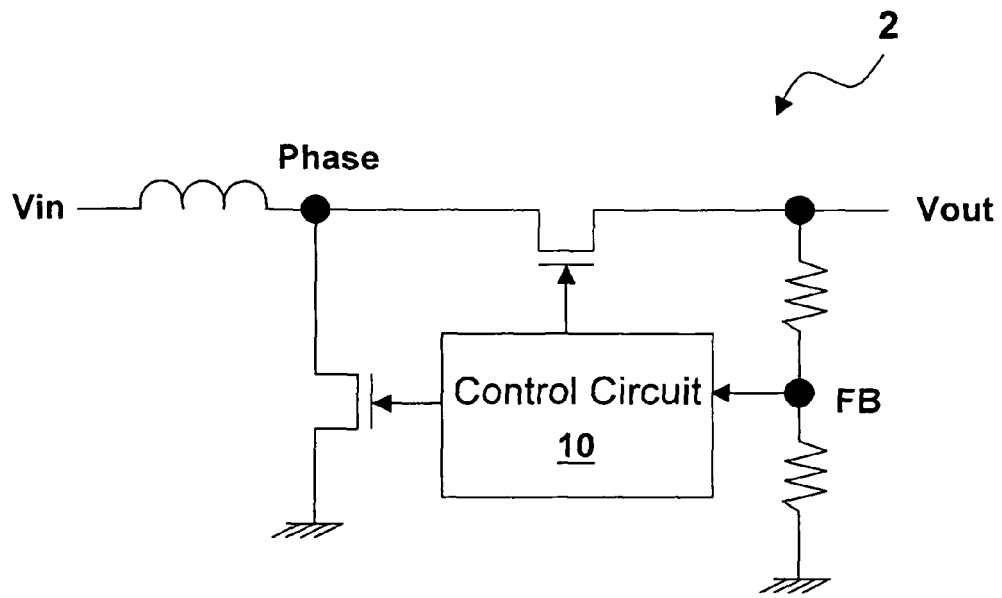
Figure 3:
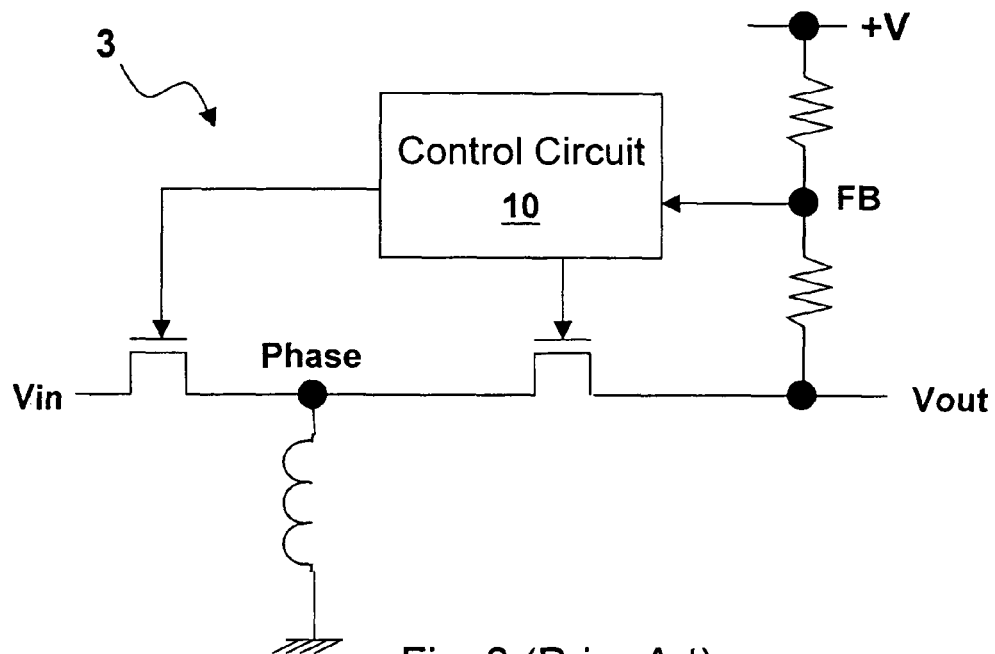
Figure 4:
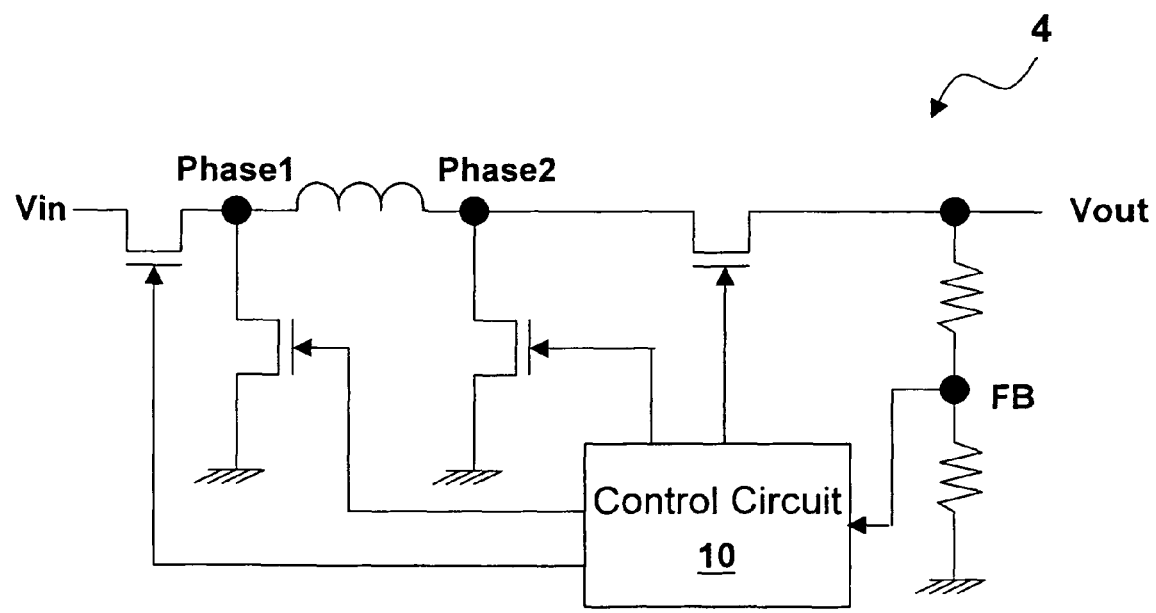
Figure 5:
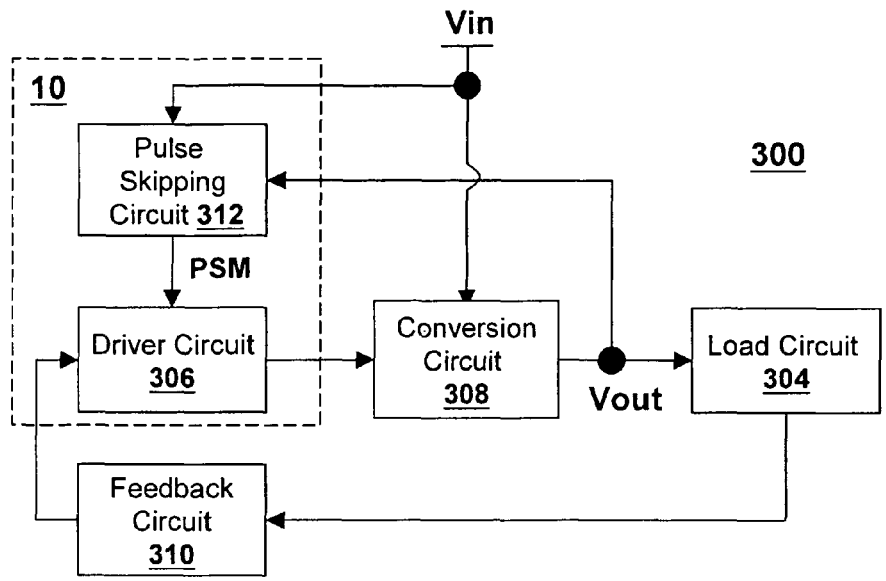
FIG. 5 is a schematic circuit diagram showing the architecture of U.S. Pat. No. 7,456,624.
Figure 6:
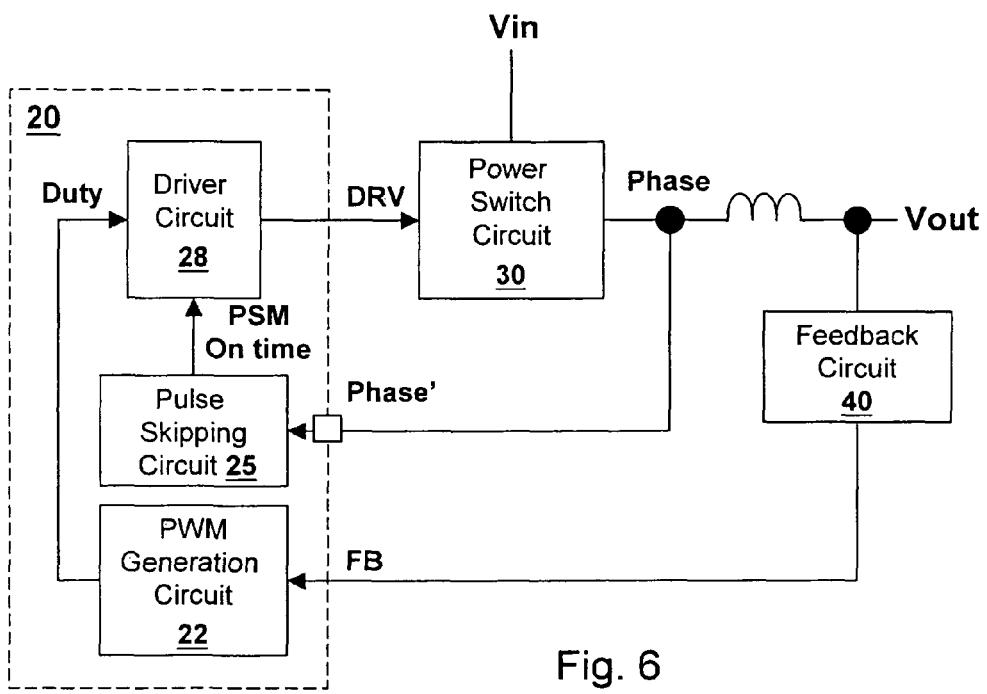
FIG. 6 shows an embodiment of the present invention.

FIG. 6 shows an embodiment of the present invention, with a buck converter as an example. As shown in the figure, the switching regulator comprises a control circuit 20, a power switch circuit 30, an inductor, and a feedback circuit 40. The control circuit 20 controls the operation of at least one power transistor switch to convert an input voltage to an output voltage. The feedback circuit 40 generates a feedback signal FB and sends it to the control circuit 20, such that the control circuit 20 can generate a switching control signal DRV according the feedback signal FB.

One feature of the present invention is to obtain a signal from a node Phase between the power switch circuit 30 and the inductor, and send it to the inside of the control circuit 20 for determining On-time in the pulse skipping mode. Referring to FIGS. 1-4, each power transistor switch is coupled between a constant voltage level (input voltage Vin, output voltage Vout, or ground) and the node Phase; thus, the node Phase can be referred to as a "non-constant voltage level node". Since the present invention does not obtain a signal from the input voltage Vin or the output voltage Vout, when the control circuit 20 is manufactured into an IC, it is not required to provide two extra pins for connection to the input voltage Vin and output voltage Vout. Instead, it is only required to use the pin Phase' which already exists (the pin Phase' is required for controlling the power transistor switches, so no extra pin is added). Besides, because the On-time in the pulse skipping mode is calculated according to one single source (the signal from the node Phase), unlike prior art, the calculation will not involve inaccuracy due to errors in processing signals (Vin and Vout) from two different sources (such as due to time gap between timings in obtaining the two signals).

The control circuit 20 comprises a PWM generation circuit 22, a pulse skipping circuit 25, and a driver circuit 28. The PWM generation circuit 22 generates a duty signal Duty according to the feedback signal FB. The pulse skipping circuit 25 determines On-time in the pulse skipping mode (PSM On-time) according to a signal from node Phase. The driver circuit 28 is controlled by one of the signals from the PWM generation circuit 22 and the pulse skipping circuit 25.

As mentioned above, the PSM On-time should preferably be set according to the application environment of the switching regulator. According to the present invention, the PSM On-time is preferably set with reference to the On-time of the switching regulator under normal loading condition. In this way, the PSM On-time will be able to match with the environment that the switching regulator is applied to.

Figure 7:
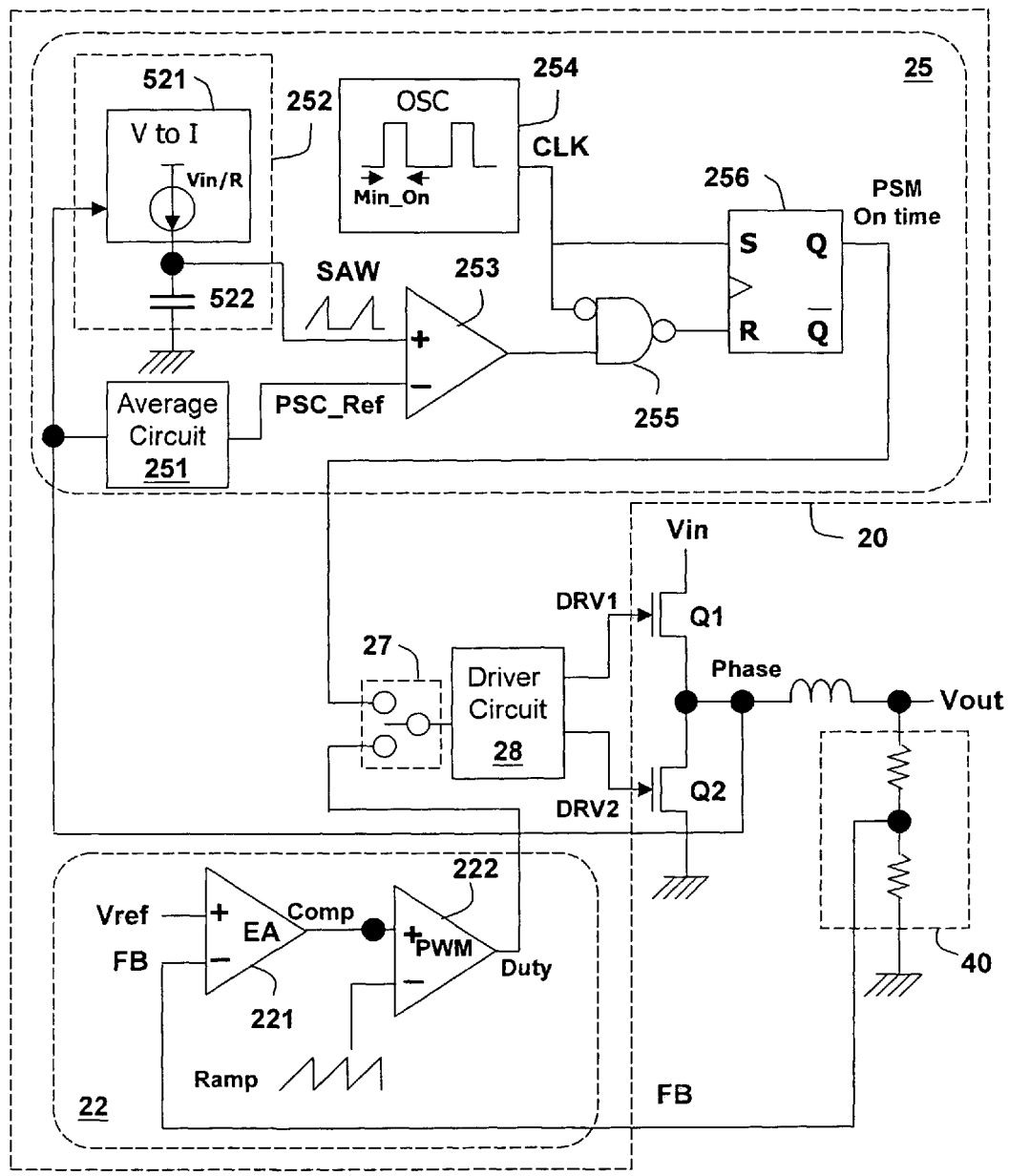
FIG. 7 shows a more specific embodiment of the present invention.

Referring to FIG. 7, the lower part of FIG. 7 shows an embodiment of the PWM generation circuit 22. The PWM generation circuit 22 includes an error amplifier 221 and a PWM comparator 222. The error amplifier 221 generates an error amplification signal Comp by comparing the feedback signal FB with a reference signal. The PWM comparator 222 generates the duty signal Duty by comparing the error amplification signal Comp with a sawtooth wave signal Ramp.

Figure 8:
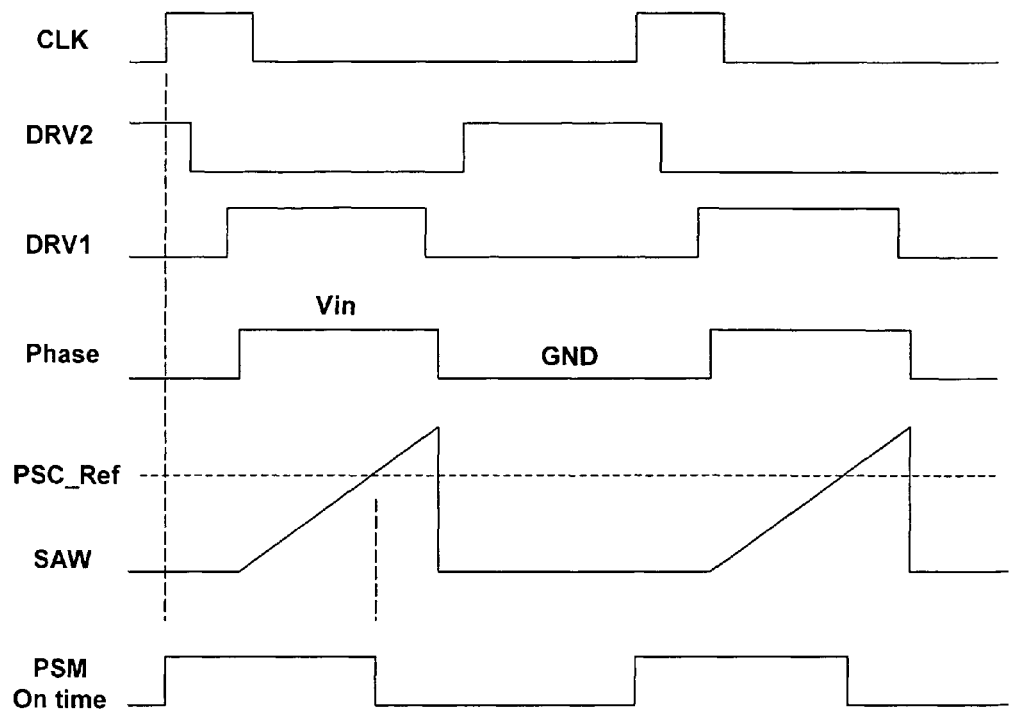
FIG. 8 shows the waveforms in the circuit of FIG. 7.

The upper part of FIG. 7 shows an embodiment of the pulse skipping circuit 25, which determines the PSM On-time according to a signal from the node Phase. More specifically, referring to FIGS. 7 and 8, when DRV1 is at high level and DRV2 is at low level, the voltage at node Phase is equal to Vin. The signal from node Phase at this time point is converted to a current signal by a voltage-to-current conversion circuit 521. The current signal is proportional to the voltage at the node Phase, that is, the input voltage Vin. A capacitor 522 is charged by the current signal to generate a sawtooth wave signal SAW, whose slope is proportional to the input voltage Vin. In other words, the voltage-to-current conversion circuit 521 and the capacitor 522 constitute a sawtooth wave generation circuit 252, which generates the sawtooth wave signal SAW having a slope proportional to the input voltage Vin.

Figure 9:
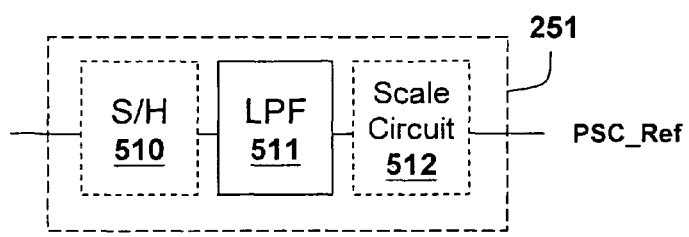
FIG. 9 shows an embodiment of an average circuit 251.

On the other hand, the pulse skipping circuit 25 uses an average circuit 251 to obtain an average value of the signal from node Phase. The average value is equal to the output voltage Vout. The average circuit 251 can be embodied in various forms. For example, referring to FIG. 9, a DC (direct current) value of the signal from node Phase can be obtained by a low-pass filter 511. The DC value is equal to the output voltage Vout. In addition, a scale circuit 512 can be provided after the low-pass filter circuit 511, to obtain a DC signal PSC_Ref proportional to the output voltage Vout. If necessary, a sample-and-hold circuit 510 can be provided before the low-pass filter 511, to ensure the accuracy of the signal. Referring to FIG. 7, the DC signal PSC_Ref is compared with the sawtooth signal SAW in a comparator 253 to generate a pulse width proportional to Vout/Vin. The pulse width is related to the On-time of the switching regulator under the normal loading condition. Thus, the PSM On-time can be generated according to the output of the comparator 253. The comparator 253 can be a general comparator or a hysteresis comparator.

There are many ways to generate the PSM On-time according to the output of the comparator 253. For example, the output of the comparator 253 can be directly used as the PSM On-time (with proper arrangement of its phase). The upper part of FIG. 7 shows another embodiment, to ensure the minimum PSM On-time not less than a predetermined lower limit. As shown in the figure, an oscillation circuit 254 generates a clock signal CLK (whose pulse width is the minimum On-time, Min_On), to be used as a setting input of a flip-flop circuit 256. In the meantime, the clock signal CLK and the output of the comparator 253 are subject to logic operation in a logic circuit 255, and the output of the logic circuit 255 is used as a resetting input of the flip-flop circuit 256. In other words, the flip-flop circuit 256 generates an output signal whose rising edge is determined by the rising edge of the clock signal CLK, and whose falling edge is determined by the later falling edge of the clock signal CLK and the output of the comparator 253. Thus, proper PSM On-time can be generated, with a minimum On-time Min_On.

A selection circuit 27 selects one between the output signal from the PWM generation circuit 22 and the output signal from the pulse skipping circuit 25, and sends the selected signal to the driver circuit 28. In the normal operation mode, the selection circuit 27 selects the output from the PWM generation circuit 22. In the pulse skipping mode, the selection circuit 27 selects the output from the pulse skipping circuit 25.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positive and negative input terminals of the comparators, error amplifiers, and operational amplifiers are interchangeable, with corresponding amendment of the circuit in processing these signals. As another example, a device which does not substantially influence the primary function of a signal can be inserted between any two devices in the shown embodiments, such as a resistor between the node Phase and pin Phase'. As yet another example, this invention is also applicable to asynchronous switching regulators wherein one of the power transistor switches is replaced by a diode. In view of the foregoing, the spirit of the present invention should cover all such and other modifications and variations, which should be interpreted to fall within the scope of the following claims and their equivalents.

What is claimed is:

1. A switching regulator comprising:
   a power switch circuit including at least one power transistor switch which operates to convert an input voltage to an output voltage;
   a PWM (Pulse Width Modulation) generation circuit for generating a duty signal in a normal operation mode according to a feedback signal relating to the output voltage;
   a pulse skipping circuit for calculating On-time in a pulse skipping mode, the On-time being calculated according to a signal from a node with non-constant voltage level, the node being connected with the power transistor switch, wherein the pulse skipping circuit includes:
      an average circuit for obtaining an average of the signal from the node and outputting a signal proportional to the average;
      a sawtooth wave generator for generating a sawtooth wave signal according to the signal from the node, wherein the slope of the sawtooth wave signal relates to the input voltage; and
      a comparator for comparing the output of the average circuit with the sawtooth wave signal to determine the On-time in the pulse skipping mode; and
   a driver circuit for driving the at least one power transistor switch according to one of the outputs from the PWM generation circuit and the pulse skipping circuit.

2. The switching regulator of claim 1, wherein the pulse skipping circuit further includes:
   a minimum On-time generation circuit; and
   a selection circuit for selecting a wider pulse width output from the outputs of the comparator and the minimum On-time generation circuit.

3. The switching regulator of claim 1, wherein the pulse skipping circuit further includes:
   an oscillation circuit for generating a clock signal having a pulse width which is the minimum On-time; and
   a flip-flop circuit generating an output signal whose rising edge is determined according to a rising edge of the clock signal, and whose falling edge is determined according to the later falling edge of the clock signal and the output of the comparator.

4. The switching regulator of claim 1, wherein the average circuit includes a low-pass filter for obtaining a DC (direct current) value of the signal from the node.

5. The switching regulator of claim 4, wherein the average circuit further includes a scale circuit for generating a signal proportional to the DC value.

6. The switching regulator of claim 1, wherein the sawtooth wave generator includes:
   a voltage-to-current conversion circuit converting a voltage at the node to a current signal; and
   a capacitor charged by the current signal, for generating the sawtooth wave signal.

7. A control circuit for controlling a switching regulator to convert an input voltage to an output voltage by operating at least one power transistor switch, the power transistor switch having a terminal coupled to a node with non-constant voltage level, the control circuit comprising:
   a pin receiving a signal from the node with non-constant voltage level;
   a PWM generation circuit for generating a duty signal in a normal operation mode according to a feedback signal relating to the output voltage;
   a pulse skipping circuit for calculating On-time in a pulse skipping mode, the On-time being calculated according to the signal from the node, wherein the pulse skipping circuit includes:
      an average circuit for obtaining an average of the signal from the node and outputting a signal proportional to the average;
      a sawtooth wave generator for generating a sawtooth wave signal according to the signal from the node, wherein the slope of the sawtooth wave signal relates to the input voltage; and
      a comparator for comparing the output of the average circuit with the sawtooth wave signal to determine the On-time in the pulse skipping mode; and a driver circuit for generating a driver signal according to one of the outputs from the PWM generation circuit and the pulse skipping circuit.

8. The control circuit of claim 7, wherein the pulse skipping circuit further includes:

a minimum On-time generation circuit; and a selection circuit for selecting a wider pulse width output from the outputs of the comparator and the minimum On-time generation circuit.

9. The control circuit of claim 7, wherein the pulse skipping circuit further includes:

an oscillation circuit for generating a clock signal having a pulse width which is the minimum On-time; and a flip-flop circuit for generating an output signal whose rising edge is determined according to a rising edge of the clock signal, and whose falling edge is determined according to the later falling edge of the clock signal and the output of the comparator.

10. The control circuit of claim 7, wherein the average circuit includes a low-pass filter for obtaining a DC value of the signal from the node.

11. The control circuit of claim 10, wherein the average circuit further includes a scale circuit for generating a signal proportional to the DC value.

12. The control circuit of claim 7, wherein the sawtooth wave generator includes:

a voltage-to-current conversion circuit converting a voltage at the node to a current signal; and a capacitor charged by the current signal, for generating the sawtooth wave signal.

13. A method for determining On-time in a switching regulator which converts an input voltage to an output voltage by operating at least one power transistor switch, the power transistor switch having a terminal coupled to a node with a non-constant voltage level, the method comprising the steps of:

generating a signal relating to an average of a signal from the node;

generating a sawtooth wave signal according to the signal from the node, wherein the slope of the sawtooth wave signal relates to the input voltage; and determining On-time in the pulse skipping mode by comparing the signal relating to the average of the signal from the node with the sawtooth wave signal.

14. The method of claim 13, wherein the step of generating the signal relating to the average of the signal from the node includes:

low-pass filtering the signal from on the node.

15. The method of claim 13, wherein the step of generating the signal relating to the average of the signal from the node further includes:

generating a signal proportional to the DC value of the signal from the node.

16. The method of claim 13, wherein the step of generating the sawtooth wave signal includes:

converting a voltage at the node to a current signal; and charging a capacitor by the current signal, to generate the sawtooth wave signal.

17. The method of claim 13 further comprising:

determining a minimum On-time; and determining On-time by selecting a longer one of the minimum On-time and the On-time in the pulse skipping mode determined by the comparing step.

18. The method of claim 13 further comprising:

generating a clock signal having a pulse width which is the minimum On-time; and determining a start time of the On-time in the pulse skipping mode according to a rising edge of the clock signal, and an end time according to the later of a falling edge of the clock signal and the end time of the On-time in the pulse skipping mode determined in the comparing step.

* * * * *